United States Patent Office 3,591,502
Patented July 6, 1971

---

3,591,502
COPOLYMERS CONTAINING ETHYLENE AND UNSATURATED KETONES ARE WAX CRYSTAL MODIFIERS FOR MINERAL OIL
Stephan Ilnyckyj, Islington, Ontario, and Syed S. H. Gilani, Sarnia, Ontario, Canada, assignors to Esso Research and Engineering Company
No Drawing. Filed July 15, 1968, Ser. No. 744,667
Int. Cl. C10m 1/28
U.S. Cl. 252—52R                    4 Claims

ABSTRACT OF THE DISCLOSURE

Copolymers of ethylene and of ethylenically unsaturated ketone, having number average molecular weights of 1,000 to 50,000, are useful as wax crystal modifiers for distillate hydrocarbon fuel oils where they can be used to depress the pour point and improve flow and can also be used as dewaxing aids in preparing light distillate lubricating oils.

BACKGROUND OF THE INVENTION

The present invention relates to copolymers of ethylene with unsaturated ketones containing a total of 4 to 24 carbon atoms, which copolymers are useful as wax crystal modifiers in distillate hydrocarbon oils.

DESCRIPTION OF THE PRIOR ART

It is known that pour point depressants for middle distillate fuel oils can be formed by copolymerizing ethylene and vinyl esters of lower fatty acids, particularly vinyl acetate, as described for example in U.S. Pat. Nos. 3,048,479; 3,093,623 and 3,131,168; or by copolymerizing ethylene with alkyl acrylates as described in Canadian Pat. 678,875.

The present invention differs from the aforesaid prior art in finding that copolymers of ethylene with unsaturated ketones, e.g., vinyl alkyl ketones, form affective pour depressants for oils, particularly middle distillate fuel oils and can also be used as dewaxing aids.

In addition, some of the prior ethylene copolymer pour point depressants, while very effective in treating distillate oil to lower the pour point, sometimes result in wax crystals having large particle sizes ranging from one millimeter up to an inch in their largest dimension, which tend to plug filter equipment normally used on delivery trucks and fuel oil storage systems, when the oil is cooled below its cloud point, even though above its pour point. On the other hand, ethylene-ketone copolymers of the present invention have good pour point reduction, and when used in distillate oil, in addition appear to generally form smaller wax crystals during cooling of the treated oil than some of the aforesaid prior art ethylene copolymer pour depressants. With the ethylene-ketone system specifically tested, the maximum size of the wax crystals that are formed on cooling at rates encountered during cold weather are generally reduced to a particle size in the order of about 0.1 millimeter or less. As a result, even though the cloud point of the oil treated with the new copolymers was substantially the same as the cloud point when the oil is treated with prior art ethylene copolymers, an important improvement in filterability was obtained. Thus, generally speaking, the new copolymers that were tested appear to eliminate a problem of clogged filters associated with the conventional pumps employed on oil delivery trucks, and also with the usual screens used in conjunction with the oil storage tanks to prevent the accidental inclusion of foreign matter in the oil system. These screens traditionally are in the order of 60 mesh or coarser and have a tendency to clog if the wax crystal size is too large.

SUMMARY OF THE INVENTION

The copolymers of the invention will comprise at least 80 mole percent of a mixture of ethylene and copolymerizable unsaturated ketone, which mixture will consist of about 4 to 70, preferably 10 to 60 molar proportions of ethylene per molar proportion of ketone, said copolymers being oil-soluble and having a number average molecular weight in the range of about 1,000 to 50,000, preferably about 1,000 to about 20,000, and most preferably 1,000 to 5,000, as measured cryscopically or by Vapor Phase Osmometry, for example by the using a Mechrolab Vapor Phase Osmometer Model 310A. 0 to 20 mole percent, usually 1 to 10 mole percent of a third or even fourth monomer may be included in the polymer.

The ketones containing a total of 4 to 24 carbons can be represented by the general formula:

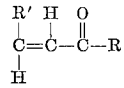

wherein R is a $C_1$ to $C_{16}$ hydrocarbon group such as aryl, alkaryl, cycloalkane, straight or branched chain alkyl group, etc. R' is hydrogen or a $C_1$ to $C_5$ alkyl group. Preferably, R is a $C_1$ to $C_6$ alkyl group and R' is hydrogen.

Examples of ketones of the invention include vinyl methyl ketone (i.e., R' is hydrogen and R is methyl), vinyl isobutyl ketone, vinyl n-octyl ketone, vinyl-isooctyl ketone, vinyl dodecyl ketone, vinyl-phenyl ketone, vinyl-naphthyl ketone, vinyl-cyclohexyl ketone, 3-penten-2-one, i.e. R is methyl and R' is methyl, etc.

Examples of the aforementioned additional monomers that can be included up to about 20 mole percent of the ethylene-vinyl ketone copolymers of the invention include various unsaturated esters of the general formula:

wherein $R_1$ is hydrogen or a $C_1$ to $C_5$ alkyl group; $R_2$ is a —$OOCR_4$ or —$COOR_4$ group wherein $R_4$ is hydrogen or a $C_1$ to $C_{16}$, preferably a $C_1$ to $C_4$, straight or branched chain alkyl group; and $R_3$ is hydrogen or —$COOR_4$. The monomer, when $R_1$ and $R_3$ are hydrogen and $R_2$ is —$OOCR_4$ includes vinyl alcohol esters of $C_2$ to $C_{17}$ monocarboxylic acids, preferably $C_2$ to $C_5$ monocarboxylic acids. Examples of such esters include vinyl acetate, vinyl isobutyrate, vinyl laurate, vinyl myristate, vinyl palmitate, etc. When $R_2$ is —$COOR_4$, such esters include methyl acrylate, methyl methacrylate, lauryl acrylate, $C_{13}$ Oxo alcohol esters of methacrylic acid, etc. Examples of monomers where $R_1$ is hydrogen and $R_2$ and $R_3$ are —$COOR_4$ groups, include mono and di-esters of unsaturated dicarboxylic acids such as: mono $C_{13}$ Oxo fumarate, di-$C_{13}$ Oxo fumarate, di-isopropyl maleate; di-lauryl fumarate; ethyl methyl fumarate; etc.

The copolymers of the invention can be prepared using the techniques used for ethylene-vinyl ester copolymerizations as described in U.S. Pats. 3,048,479; 3,131,168; 3,093,623; and 3,254,063; etc.

In general, the polymerizations are preferably carried out as follows: Solvent and all, or preferably a portion of the ketone, e.g., 0–50, preferably 10–30 wt. percent, of the total amount of ketone used in the batch, are charged to a stainless steel pressure vessel which is equipped with a stirrer. The temperature of the pressure vessel is then brought to the desired reaction temperatures and pressured to the desired pressure with ethylene. Then a free radical initiator, preferably dissolved in solvent so that it can be pumped, and additional amounts of the ketone are added to the vessel continuously, or at least periodically, during the reaction time. This continuous, or periodic, addition gives a more homogeneous copolymer product as compared to adding all the ketone at the beginning of the reaction. Also, during the reaction time, as ethylene is consumed in the polymerization reaction, additional ethylene can be supplied through a pressure controlling regulator so as to maintain the desired reaction pressure fairly constant at all times. Following the completion of the reaction, the liquid phase of the pressure vessel can be distilled to remove the solvent and other volatile constituents of the reacted mixture, leaving the polymer as residue.

While the above is a preferred procedure, various modifications can be used. For example, all the ketone and initiator used in the reaction can be added initially to the solvent and only additional ethylene can be added during the reaction, etc.

Usually, based upon 100 parts by weight of copolymer to be produced, then about 100 to 600 parts by weight of solvent, and about 1 to 20 parts by weight of initiator will be used.

The solvent can be any non-reactive organic solvent for furnishing a liquid phase reaction which will not poison the catalyst or otherwise interfere with the reaction, and preferably is a hydrocarbon solvent such as benzene or hexane.

The temperature used during the reaction will depend on the type of initiator employed. In general, such temperatures will be employed as to preferably result in the half-life of the initiator ranging from 15 minutes to two hours. Thus, with di-t-butyl peroxide as initiator, the temperature would preferably range from 250° F. to 380° F., preferably 300° F. With lauroyl peroxide or benzoyl peroxide on the other hand, temperatures in the range of 120° F. to 250° F., such as 180° F. to 200° F., are to be preferred. The initiator can be any conventional free radical type initiators. Specific examples of such initiators include di-benzoyl peroxide, di-tertiary butyl preoxide, tertiary butyl perbenzoate, tertiary butyl hydroperoxide, di-acetyl peroxide, di-ethyl peroxycarbonate, 2-phenyl propane -2-hydroperoxide (known also as cumene hydroperoxide), α, α'azo-diisobutyronitrile, di-lauroyl peroxide, etc.

The time of reaction will depend upon, and is interrelated to the temperature of the reaction, the choice of initiator, and the pressure employed. In general, however, ½ to 10, usually 2 to 5 hours will complete the desired reaction.

The copolymers of the invention will generally be added to hydrocarbon oils in amounts of .001 to 2 wt. percent, generally .005 to about 0.5 wt. percent, said wt. percent being based upon the weight of the oil to be treated.

The distillate hydrocarbon oils, which are treated for pour depression with the polymers of this invention, include cracked and virgin distillate oils boiling in the range of 250° to 700° F. such as heating oil and diesel fuel oil. In addition, the polymers of the invention can be used as a dewaxing aid during dewaxing. For example, the copolymers may be used in dewaxing light distillate lube oil stocks in the manner similar to that taught in U.S. Pat. 3,262,873.

The copolymers of the invention may be used alone as the sole oil additive, or in combination with other oil additives, such as other pour depressants or dewaxing aids; corrosion inhibitors; antioxidants; sludge inhibitors; etc.

The invention will be further understood by reference to the following examples which include preferred embodiments of the invention.

EXAMPLE I

A one liter stirred autoclave was first flushed with nitrogen and then with ethylene. The autoclave was charged with 200 ml. of benzene as solvent and 2.8 gms. of vinyl methyl ketone and then heated to 310° F. Ethylene was pressured into the autoclave until the ethylene pressure was 1,000 p.s.i.g. Then, injection of ditertiary butyl peroxide as initiator, and additional methyl vinyl ketone was begun to start the reaction. Said initiator and said additional ketone were continuously injected into the autoclave at an even rate. Thus, a total of 50 ml. of a peroxide solution, consisting of 15 wt. percent di-t-butyl peroxide and 85 wt. percent benzene, was injected over 1½ hours, while 11.2 gm. of vinyl methyl ketone was injected over a period of 1¼ hours from the start of the reaction. At the end of 3 hours from the start of the reaction, the temperature of the reactor was lowered to 150° F. and the product was discharged from the autoclave. The product was then stripped of the solvent and unreacted monomers by distillation under slightly reduced pressure to give a final product consisting of 97 gms. of copolymer of ethylene and vinyl methyl ketone having a number average molecular weight of 2200 as measured cryoscopically with phenanthrene.

EXAMPLES II to IV

Following the procedure of Example I, three more copolymers of ethylene and vinyl methyl ketone were prepared varying the reaction conditions and the amount of vinyl methyl ketone in the copolymer.

EXAMPLE V 10 gm. of the copolymer product from Example I was dissolved in 40 ml. of benzene and 80 ml. of isopropanol (100%) was added to the benzene-copolymer solution. This caused the precipitation from the solution of about a ⅔ portion of the dissolved copolymer, which portion had a number average molecular weight of about 1400.

The copolymer products of Examples I to V were tested for pour depression in a middle distillate hydrocarbon fuel oil, which consisted of a 50/50 wt. percent blend of virgin and cracked gas oil. This blend had an ASTM pour point of 20° F., and an ASTM final boiling point of about 660° F.

The compositions of the copolymers, their conditions of preparation and their effectiveness as pour point depressants are summarized in the following table:

TABLE I

| | Example | | | | |
|---|---|---|---|---|---|
| | I | II | III | IV | V |
| Synthesis: | | | | | |
| Ethylene pressure, p.s.i.g. | 1,000 | 1,000 | 2,000 | 1,000 | (1). |
| Reaction temperature, ° C. | 310 | 310 | 310 | 310 | |
| Time, hours | 3 | 3 | 6 | 1¾ | |
| Vinyl methyl ketone, g | 7 | 14 | 28 | 14 | |
| Di-t-butyl peroxide, g | 4.2 | 7 | 7 | 1.4 | |
| Polymer properties: | | | | | |
| Yield, g | 97 | 60 | 122 | 18 | 66% of "I." |
| Wt. percent vinyl methyl ketone | 3.7 | 13.8 | 12.1 | 52 | 8.0. |
| Molecular weight | 2,200 | 1,200 | 1,600 | 800 | 1,400. |
| ° F. pour depressing, 0.2 wt. percent copolymer | 30 | 20 | 10 | Nil | 75. |
| Mol. ratio, ethylene/ketone | 50/1 | 12/1 | 14/1 | 1.8/1 | |

[1] Precipitated from benzene solution of "I" with isopropanol.

Examples I to III show that effective pour point depressants resulted within the relative mol ratios of the invention. Example IV shows that too much of the ketone resulted in no pour depression.

As a further illustration of the invention, Example I is repeated but using vinyl phenyl ketone in place of methyl vinyl ketone. 0.1 wt. percent of the resulting polymer is added to the 50/50 blend of virgin and cracked gas oil previously described in Table I.

As still another illustration of the invention, 0.1 wt. percent of the copolymer of Example I is added as a dewaxing aid to an SAE 5 grade lube oil distillate which is a phenol treated oil, boiling in the range of 625 to 880° F. and containing about 15 wt. percent wax. The oil is then diluted with a solvent mixture of 50 vol. percent methyl isobutyl ketone and 50 vol. percent methyl ethyl ketone using 1.5 vol. of said solvent mixture per 1 vol. of oil. The solvent-oil-copolymer blend is cooled to 0° F. at a rate of 6° F./min. and then filtered.

What is claimed is:

1. A composition comprising a major amount of a distillate hydrocarbon oil selected from the group consisting of distillate fuels boiling in the range of 250° to 700° F. and light lube oil stocks and about .001 to 2.0 wt. percent of a wax crystal modifying copolymer comprising at least 80 wt. percent of ethylene and unsaturated ketone in a relative mole ratio of 4 to 60 molar proportions of ethylene per molar proportion of ketone, having a number average molecular weight of 1,000 to 50,000, and therein said ketone has the general formula:

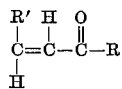

wherein R is a $C_1$ to $C_{16}$ hydrocarbon group, R' is hydrogen or a $C_1$ to $C_5$ alkyl group, and the total number of carbon atoms is 4 to 24.

2. A composition according to claim 1, wherein said oil is distillate fuel and the amount of said copolymer is about .005 to .5 wt. percent.

3. A composition according to claim 3, wherein said molecular weight is 1,000 to 5,000, R' is hydrogen and R is a $C_1$ to $C_5$ alkyl group.

4. A composition according to claim 3, wherein said ketone is vinyl methyl ketone.

References Cited
UNITED STATES PATENTS 3,449,251    6/1969    Tunkel et al. _____ 44—77

DANIEL E. WYMAN, Primary Examiner

Y. H. SMITH, Assistant Examiner

U.S. Cl. X.R.

44—62, 77